(12) United States Patent
Prentice et al.

(10) Patent No.: US 6,539,748 B2
(45) Date of Patent: Apr. 1, 2003

(54) PROCESS AND APPARATUS FOR THE PRODUCTION OF LOW PRESSURE GASEOUS OXYGEN

(75) Inventors: Alan Lindsay Prentice, Surbiton (GB); Rodney John Allam, Guildford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/059,997

(22) Filed: Oct. 22, 2001

(65) Prior Publication Data

US 2002/0100293 A1 Aug. 1, 2002

(30) Foreign Application Priority Data

Oct. 23, 2000 (EP) ............................................. 00309320

(51) Int. Cl.[7] .................................................. F25J 1/00
(52) U.S. Cl. ............................... 62/654; 62/644; 62/913
(58) Field of Search ........................... 62/632, 644, 913, 62/654

(56) References Cited

U.S. PATENT DOCUMENTS

| | | | |
|---|---|---|---|
| 4,668,260 A | 5/1987 | Yoshino | 62/11 |
| 4,732,595 A | 3/1988 | Yoshino | 62/11 |
| 4,853,015 A | 8/1989 | Yoshino | 62/40 |
| 5,408,831 A | 4/1995 | Guillard | 62/24 |
| 5,505,052 A | 4/1996 | Ekins et al. | 62/40 |
| 5,596,885 A * | 1/1997 | Grenier | 62/913 |
| 5,941,098 A | 8/1999 | Guillard et al. | 62/656 |

FOREIGN PATENT DOCUMENTS

EP    0949471    10/1999    .............. F25J/3/04

* cited by examiner

Primary Examiner—Ronald Capossela
(74) Attorney, Agent, or Firm—Willard Jones II

(57) ABSTRACT

A process and apparatus for the production of low pressure gaseous oxygen ("GOX") in which compressed and purified feed air (1) is cooled and at least partially condensed in heat exchange means (E1) having a warm end and a cold end and the cooled and at least partially condensed feed air (2) is then distilled in a cryogenic distillation column system (C1, C2). A liquid oxygen ("LOX") product stream (8) is removed from the column system (C1, C2) and vaporized and warmed by heat exchange (E1) to produce GOX. LOX refrigerant (10) from an external source is used to provide a portion of the refrigeration duty required for the cooling and at least partial condensation of the feed air stream (1). The LOX refrigerant is injected into the heat exchange means (E1) either:

(a) at a pressure greater than that of the LOX product entering the heat exchange means (E1); or
(b) at a pressure substantially equal to that of the LOX product entering the heat exchange means and at an intermediate point between the warm and cold ends where the temperature of the heat exchange means is above the boiling temperature of the LOX refrigerant.

21 Claims, 2 Drawing Sheets

PROCESS AND APPARATUS FOR THE PRODUCTION OF LOW PRESSURE GASEOUS OXYGEN

TECHNICAL FIELD OF THE INVENTION

The present invention relates generally to the production of oxygen gas ("GOX") and, in particular, to the production of low pressure GOX by the cryogenic distillation of air.

BACKGROUND OF THE INVENTION

There is a considerable market, particularly in the glass and metallurgical industries, for low purity, e.g. from 90 to 98 wt %, low pressure, e.g. from 1.5 to 3.0 bar absolute, GOX. The GOX is used in processes requiring oxygen-enriched combustion in which the required pressure of the oxygen at the point of use is near atmospheric.

An $O_2$ vacuum swing absorption ("VSA") process is commonly used for applications requiring 90 to 93% $O_2$. However, up to 98% $O_2$ GOX is often required and, thus, cryogenic plant processes are also used. There are many prior public disclosures of processes using cryogenic distillation of air to produce a GOX product. A number of the disclosed processes use a liquid cryogen from an external source as a refrigerant. For example, in U.S. Pat. No. 4,853,015 (Yoshino) and U.S. Pat. No. 4,732,595 (Yoshino), liquid oxygen ("LOX") is injected into the low pressure column of a double column distillation system to provide refrigeration. In U.S. Pat. No. 4,732,595, an expander is used to provide some of the refrigeration requirement of the process. The use of such an expander increases the overall capital and running costs of the process and, as such, is undesirable.

In U.S. Pat. No. 5,408,831 (Guillard et al), air is distilled cryogenically in a double distillation column system without the use of an expander to provide a portion of the refrigeration duty. GOX at from 2 to 5 bar absolute is taken from the low pressure ("LP") column of the distillation column system as product. It is an essential feature of the Guillard process that some refrigeration is provided by expansion of at least one gaseous product from an LP column of the distillation column system. Part of the refrigeration duty required to condense the feed air fed to the column system can be provided by LOX refrigerant from an external source. The refrigerant may be introduced into the LP column or into the GOX product at an intermediate location of the main heat exchanger. The actual temperature at which the LOX is introduced is chosen to minimise the risk of explosion of any hydrocarbon impurities.

In order to achieve the required pressure of the GOX product, the column system in U.S. Pat. No. 5,408,831 is back-pressurized. As a result of the back-pressurization of the column system, the air pressure is necessarily higher, at a pressure from 8 to 16 bar absolute, than that in processes without column back-pressurization giving a significant power penalty of about 12% for a given air flow. Such a penalty represents an undesirable increase in operating cost especially when it is considered that power is the main operating cost of an air separation plant.

Processes producing low pressure GOX in which air compressor power is minimized without adversely effecting both the overall capital and running costs are desirable. In this connection, it is known to provide at least part of the refrigeration duty required to cool and at least partially condense by heat exchange feed air prior to cryogenic distillation through the use of a LOX refrigerant from an external source.

U.S. Pat. No. 5,505,052 (Ekins et al) discloses a process for the cryogenic distillation of air using a double column system having a high pressure ("HP") column and a LP column to produce GOX at a pressure of about 25 bar for use in installations comprising, for example, electric arc furnaces adapted to produce stainless steel. Oxygen is withdrawn in liquid form from the base of the LP column, brought to the utilization pressure by a pump and vaporized and reheated to about ambient temperature in the heat exchange line against the feed air. The gaseous oxygen is then fed to the installation.

A portion of the LOX withdrawn from the base of the column may be sent to storage, for example, during periods of low demand for GOX in the installation where it is kept until such time as the demand for GOX at the installation becomes high whereupon it is pumped to the utilization pressure and vaporized and reheated to about ambient temperature in the heat exchange line against the feed air. The LOX from storage may travel through the same vaporization passages through the heat exchange line as the LOX from the column system or it may travel through separate vaporization passages. The gaseous oxygen is then fed to the installation.

Additional LOX may be added to the LOX in storage from tank trucks, for example, during prolonged periods of high demand for GOX. Alternatively, the storage facility may not be connected to the double column system and may be supplied only by tank trucks. In the exemplified embodiments of the process disclosed in Ekins et al, LOX, whether from the double column system or from storage, enters the heat exchange line at the cold end, i.e. the end at which cooled feed air exits the line.

In Ekins et al, both the LOX product from the distillation column and the additional LOX from storage are pumped to a pressure (about 25 bar) that is substantially higher that the pressure (about 5 to 6 bar) of the LP column. In addition, a portion of the total refrigeration duty requirement of the process is provided by an expander and a further portion is provided by the warming and evaporation of a stream of liquid argon.

It is an objective of the present invention to provide a process and apparatus for the production of low pressure GOX with lower capital and operating costs compared with existing processes. It is a further objective that the process reduce the risk of explosion resulting from deposition in the heat exchange line of impurities, for example hydrocarbons, $CO_2$ and $N_2O$, from LOX. This risk is explained in more detail in the "Detailed Description of the Invention" section below.

SUMMARY OF THE INVENTION

It has been found that the objectives of the invention can be achieved using a process in which a portion of the refrigeration duty is provided by LOX refrigerant from an external source. According to a first aspect of the present invention, there is provided an improved process for the production of GOX, said process comprising:

cooling and at least partially condensing feed air by heat exchange using heat exchange means having a warm end and a cold end to produce cooled and at least partially condensed feed air;

distilling said cooled and at least partially condensed feed air in a distillation column system to produce LOX product;

removing a stream of said LOX product from the distillation column system and vaporizing said LOX product stream by heat exchange against the feed air to produce GOX; and separately from the LOX product, vaporizing LOX refrigerant from an external source by heat exchange against the feed air to produce vaporized refrigerant thereby providing a portion of the refrigeration duty required to cool and at least partially condense the feed air;

the improvement consisting of injecting the LOX refrigerant into the heat exchange means at a pressure greater than that of the LOX product entering the heat exchange means.

In accordance with the first aspect of the present invention, there is also provided an improved process for the production of GOX, said process comprising:

cooling and at least partially condensing feed air by heat exchange using heat exchange means having a warm end and a cold end to produce cooled and at least partially condensed feed air;

distilling said cooled and at least partially condensed feed air in a distillation column system to produce LOX product;

removing a stream of said LOX product from the distillation column system and vaporizing said LOX product stream by heat exchange against the feed air to produce GOX; and separately from the LOX product, vaporizing LOX refrigerant from an external source by heat exchange against the feed air to produce vaporized refrigerant thereby providing a portion of the refrigeration duty required to cool and at least partially condense the feed air;

the improvement consisting of injecting the LOX refrigerant into the heat exchange means at a pressure substantially equal to that of the LOX product entering the heat exchange means and at an intermediate point between the warm and cold ends where the temperature of the heat exchange means is above the boiling temperature of the LOX refrigerant.

According to a second aspect of the present invention, there is provided apparatus for carrying out the process of the first aspect of the present invention for producing gaseous oxygen, said apparatus comprising:

heat exchange means for cooling and at least partially condensing feed air to produce cooled and at least partially condensed feed air, said heat exchange means having a warm end and a cold end;

a distillation column system for distilling cooled and at least partially condensed feed air to produce LOX product;

conduit means to carry cooled feed air from the heat exchange means to the distillation column system; and conduit means to carry LOX product from the distillation column system to the heat exchange means;

wherein the apparatus further comprises conduit means to carry LOX refrigerant at a greater pressure than the pressure of the LOX product entering the heat exchange means from an external supply to the heat exchange means.

(b) conduit means to carry LOX refrigerant at a pressure that is substantially equal to the pressure of the LOX product entering the heat exchange means from an external supply to an intermediate point between the warm and cold ends of the heat exchange means where the temperature of the heat exchange means is above the boiling temperature of the LOX refrigerant.

DETAILED DESCRIPTION OF THE INVENTION

Figure 1:
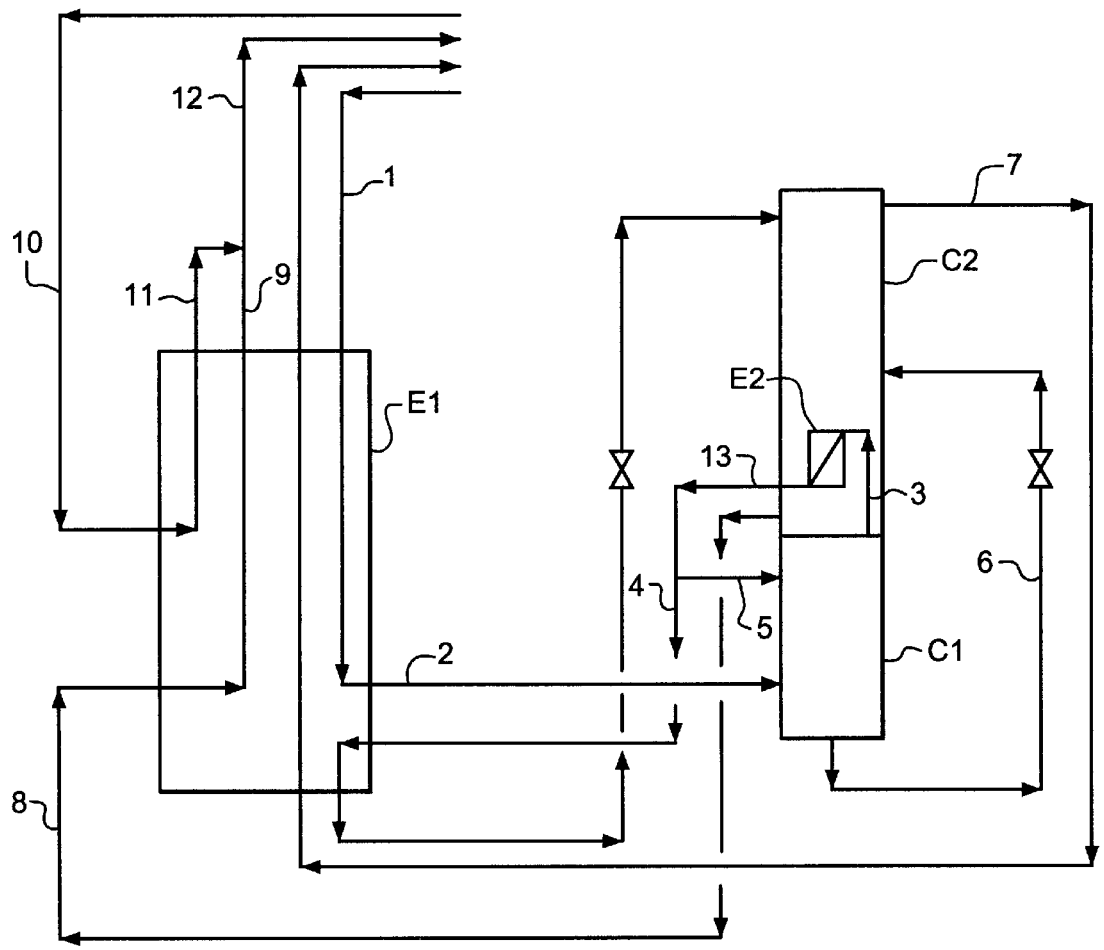
FIG. 1 is a flowsheet of a presently preferred embodiment of the invention.

The process according to the present invention comprises cooling and at least partially condensing feed air by heat exchange using heat exchange means having a warm end and a cold end to produce cooled and at least partially condensed feed air. The cooled and at least partially condensed feed air is distilled in a distillation column system to produce LOX product. A stream of the LOX product is removed from the distillation column system and vaporized by heat exchange against the feed air to produce GOX. Separately from the LOX product, LOX refrigerant from an external source is vaporized by heat exchange against the feed air to produce vaporized refrigerant thereby providing a portion of the refrigeration duty required to cool and at least partially condense the feed air. The improvement of the process consists of injecting the LOX refrigerant into the heat exchange means either:

(a) at a pressure greater than that of the LOX product entering the heat exchange means; or (b) at a pressure substantially equal to that of the LOX product entering the heat exchange means and at an intermediate point between the warm and cold ends where the temperature of the heat exchange means is above the boiling temperature of the LOX refrigerant.

The heat exchange means comprises a "warm end" (or "hot end") and a "cold end". The warm end (or hot end) is the end at which the feed air enters the heat exchange means and the cold end is the end at which the cooled and at least partially condensed feed air leaves the heat exchange means. The terms "warm end" (or "hot end") and "cold end" are commonly used in the art to distinguish the two ends of heat exchange means by their relative temperatures.

GOX may be produced at a slightly elevated pressure by a known technique in which LOX product is withdrawn from the LP column of a double column system. LOX is withdrawn from the distillation column system and is vaporized and warmed by heat exchange against the feed air. A fraction of the feed air is condensed by heat exchange against the withdrawn LOX and, thus, there is less air vapor entering the distillation column system than there would otherwise be if the feed air were to be subjected to indirect heat exchange with GOX withdrawn from the column system. This has the effect of reducing the efficiency of the distillation when compared to a process in which GOX is withdrawn from the distillation column system. However, as only low purity GOX is required, there is no performance penalty as about 99.7% of the $O_2$ becomes product. Therefore, the process is surprisingly efficient.

One reason for using LOX as the refrigerant is that the vaporized LOX refrigerant may be combined with the GOX produced by the vaporization of the LOX product to produce GOX product. In this way, there is no wastage of vaporized refrigerant.

Preferably, the distillation column system comprises a multiple column system having a higher pressure ("HP") column and a lower pressure ("LP") column thermally integrated by the condensation of nitrogen overhead from the HP column against liquid bottoms in the LP column. A portion of the condensed HP column nitrogen overhead may be subcooled by heat exchange to produce a subcooled nitrogen stream, which can be fed to the LP column.

In preferred processes, substantially all of the refrigeration duty required to keep the plant in energy balance is provided by the LOX refrigerant. Preferably, no refrigeration duty is provided by expansion of a process stream. Any heat leak into the process via the insulation and the fact that the product streams leave the heat exchanger at a temperature that is slightly lower then the entry temperature of the feed air is taken into account in calculating the amount of LOX refrigerant required.

Surprisingly, vaporizing and warming LOX refrigerant separately from the product LOX has little effect on the temperature profiles of the main heat exchanger and causes only a very small increase in the amount of the refrigerant. This is particularly apparent for a process of the invention in which the LOX refrigerant is vaporized and warmed at substantially the same pressure as the LOX product but is introduced to the heat exchanger at an intermediate point between the warm and cold ends of the heat exchanger.

The LOX refrigerant is vaporized separately from the LOX product to reduce the risk of any problems resulting from the build up of hydrocarbon impurities such as ethylene due to deposition of $CO_2$ and $N_2O$ on the interior wall surfaces of the boiling passages through the heat exchanger.

Commercial sources of LOX refrigerant, e.g. produced by an air separation plant, will contain hydrocarbons, $CO_2$ and $N_2O$ impurities. The concentration of these impurities in the LOX refrigerant will vary depending on the plant producing it, the mode of operation of the plant and the ratio of LOX produced to feed air entering the plant. Concentrations of about 1500 ppb (vol.) $CO_2$ and about 3000 ppb (vol.) $N_2O$ are typical.

As the LOX product boils at about 2.2 bar absolute, the vapor phase solubility of $CO_2$ and $N_2O$ impurities is about 50 ppb (vol.) and about 500 ppb (vol.) respectively. If the LOX refrigerant were to be introduced directly into the LOX product stream, the impurity concentration of the combined LOX stream would be sufficiently increased to warrant concern about the unwanted and dangerous build up of impurity deposits in the heat exchanger. Even a very small amount of "slippage" of $CO_2$ and $N_2O$ from the air purification will cause the concentration of $CO_2$ and/or $N_2O$ to exceed the vapor phase solubility limit and result in at least partial blockage of the heat exchanger by deposited $CO_2$ and $N_2O$.

In one embodiment, vaporizing LOX refrigerant without causing blockage of the heat exchanger by $CO_2$ and $N_2O$ deposits is achieved by vaporizing the refrigerant at a greater pressure than the LOX product such that, at the boiling temperature of the LOX refrigerant, the $CO_2$ and $N_2O$ impurity concentrations are below the vapor phase solubility limits.

In an alternative embodiment, blockage of the heat exchanger by unwanted impurity deposits is avoided by injecting the LOX refrigerant into the heat exchange means at a pressure that is substantially equal to the pressure of the LOX product as it enters the heat exchange means, provided that the point of injection is between the warm and cold ends of the heat exchange means. Preferably, the temperature of the heat exchange means at the intermediate point of injection is from about −165° C. to about −80° C., i.e. substantially above the $O_2$ boiling temperature.

In this alternative embodiment, as the preferred temperature of the point of injection in the heat exchanger is relatively warm, $CO_2$ and $N_2O$ solubilities are relatively high and deposition on the surfaces of the heat exchanger will not occur. For the preferred range of $O_2$ vaporization pressure, i.e. about 1.5 bar absolute to about 3.0 bar absolute, vaporization actually occurs at about −179° C. to about −171° C. respectively and any solid $CO_2$ and $N_2O$ that form initially does not deposit on the metal but is carried onwards towards a warmer part of the heat exchanger and after a short distance the whole stream has reached or exceeded about −165° C. to about −80° C. by which time $CO_2$ and $N_2O$ will have sublimed into vapor and cannot precipitate.

In preferred embodiments of the process, the LOX product stream is pressurized before vaporizing said stream by heat exchange to provide GOX. The LOX product stream may be pumped. Preferably, however, the LOX product stream is not pumped and, instead, pressurization may be achieved hydrostatically by, for example piping the stream from the distillation column system to a lower elevation.

The pressure of the LOX product leaving the distillation column system is usually about 1.4 bar absolute. The pressure of the LOX refrigerant is preferably from about 4 bar absolute to about 10 bar absolute. The pressure of the GOX product may be from about 1.5 bar absolute to about 3.0 bar absolute, preferably from about 1.8 bar absolute to about 2.5 bar absolute.

The process may further comprise combining LOX refrigerant with the cooled and at least partially condensed feed air to further cool the feed air, preferably during plant cooldown. The process may also comprise introducing LOX refrigerant to the distillation column system under level control.

Preferably, the LOX refrigerant is provided by an air separation plant.

The process may further comprise withdrawing at least one nitrogen gas product stream from the distillation column system.

The feed air is preferably purified before heat exchange to reduce the $CO_2$ and $N_2O$ impurity concentrations to a level which ensures that these impurity concentrations in the LOX product are below their vapor phase solubilities at the vaporizing pressure and temperature heat exchange conditions. The feed air may be purified using, for example, either a temperature swing absorber system using alumina and CaX or a pressure swing adsorber system using alumina and 13X.

The apparatus is preferably adapted or constructed to carry out any combination of the preferred features of the process discussed above.

It is preferable to minimize the amount of LOX refrigerant consumed by the process as it is expensive. The amount required is highly dependent on the number of transfer units (NTU) of the heat exchange means. NTU is defined as follows:

$$NTU = (T_{airhot} - T_{aircold})/\text{mean } DT$$

Where $T_{airhot}$=air temperature of hot end of heat exchanger;

$T_{aircold}$=air temperature of cold end of heat exchanger mean DT=effective mean differential temperature between hot and cold stream in heat exchanger between air entry and exit.

The heat exchange means of the apparatus may have at least about 55 NTU, preferably from about 70 to about 90 NTU and more preferably about 80 NTU.

The amount of LOX refrigerant consumed in the process is also very dependent on the heat gain through the insulation. Preferably, the cryogenic portion of the apparatus, i.e. the distillation column system and the heat exchange means, is vacuum insulated to reduce heat loss.

In particularly preferred embodiments, the LOX refrigerant passes through the heat exchange means via a separate circuit to the LOX product. The LOX refrigerant preferably passes through the heat exchange means via a single passage. Further, the LOX refrigerant is preferably introduced into the heat exchange means at an intermediate point between the cold and warm ends of the heat exchange means where the temperature of the metal of the heat exchange means is above the boiling temperature of the refrigerant.

With reference to FIG. 1, a purified and compressed feed air stream 1, having a concentration of $CO_2$ and $N_2O$ low enough to prevent deposition in the main LOX circuit of the main heat exchanger E1, enters the main heat exchanger E1, preferably a plate-fin type, wherein it is cooled to a cryogenic temperature and at least partially condensed. An at least partially condensed feed air stream 2 is removed from the main heat exchanger E1 and fed to the high pressure column C1 in an double distillation column system C1, C2 having a reboiler condenser E2.

The feed air stream 2 is distilled in the high pressure column C1 and a nitrogen-rich vapor stream 3 is condensed in the condenser E2 to produce a condensed nitrogen-rich stream 13. A portion 5 of the condensed nitrogen-rich stream 13 is returned to the high pressure column C1 as reflux to purify gas rising and the remaining portion 4 is sent to the top of the low pressure column C2 via the main heat exchanger E1 where it is subcooled. An oxygen-rich stream 6 is removed from the high pressure column C1 and fed to the low pressure column C2 at an intermediate location optionally via a heat exchanger to subcool the stream.

Figure 2:
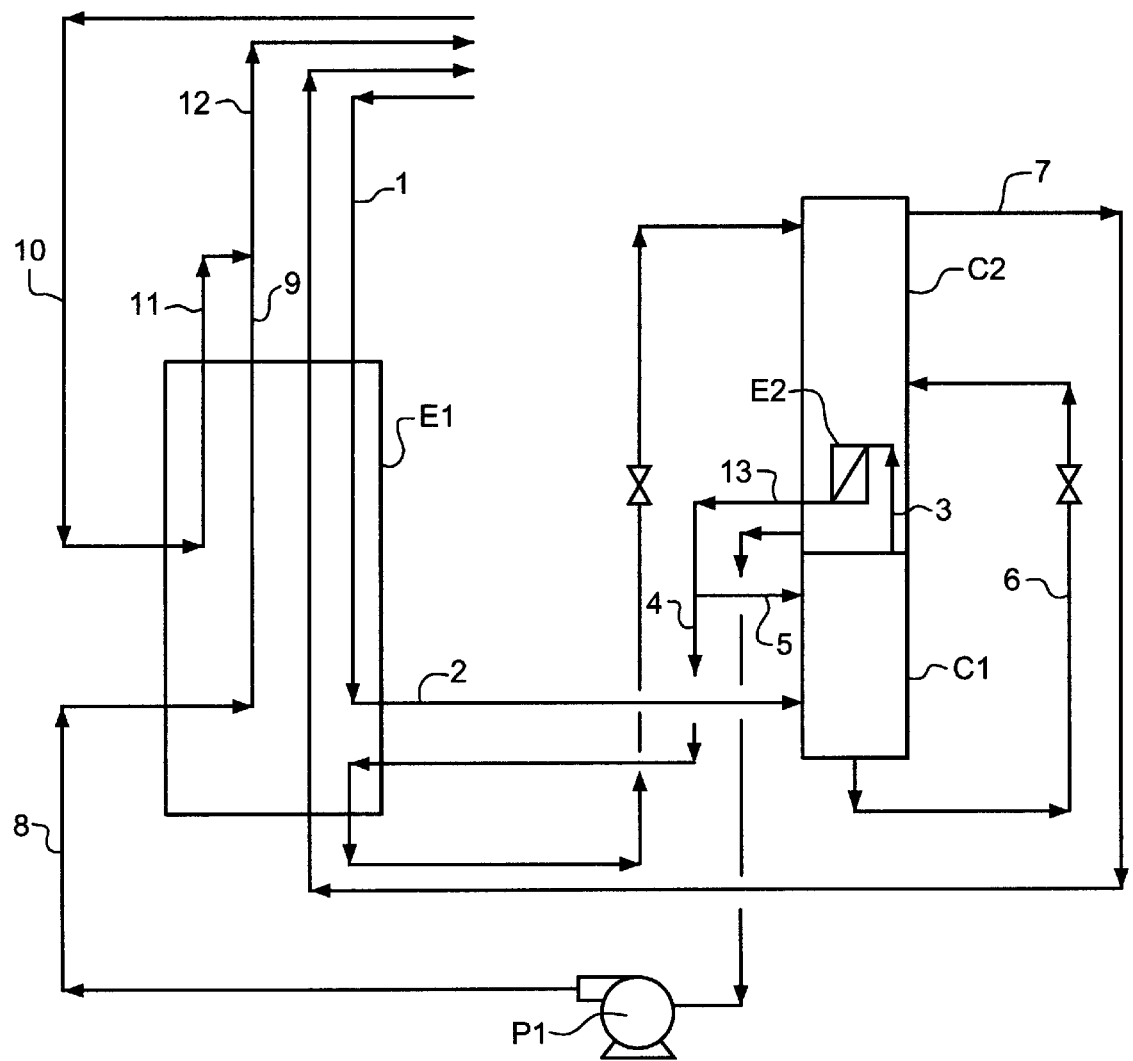
FIG. 2 is a flowsheet of a variation of the preferred embodiment of the invention.

The two liquid streams 4, 6 entering the low pressure column C2 are distilled due to vapor rising from the reboiler E2. A low pressure waste nitrogen vapor stream 7 is withdrawn from the top of the low pressure column and warmed to ambient temperature in the main heat exchanger E1. A LOX product stream 8 is withdrawn from the bottom of the low pressure column C2 and either piped to a lower elevation (as shown in FIG. 1) to gain static pressure or pumped (as shown in FIG. 2) to gain pressure before being vaporized and then warmed to ambient temperature in the main heat exchanger E1 to form GOX stream 9. In this way, GOX at a pressure typically from about 1.8 to about 2.5 bar absolute may be obtained directly from the plant.

Even though the cryogenic part of the plant is vacuum insulated to minimize heat loss, some refrigeration must be supplied to maintain a refrigeration balance. A LOX refrigerant stream 10 is introduced to a separate circuit of the main heat exchanger E1 at an intermediate point between the warm and cold ends and at a pressure equal to or higher than that for the LOX product stream 8 in a manner to avoid the deposition of $CO_2$ and $N_2O$. The LOX refrigerant stream 10 is vaporized and warming to ambient temperature to produce a stream 11 of vaporized LOX refrigerant which is combined with the GOX stream 9 to form a GOX product stream 12.

In a specific example, an airflow of 10000 $Nm^3/h$ (167 $Nm^3s$) is compressed to about 6 bar absolute, purified, cooled in the main heat exchanger E1 and fed to the HP column C1 at about 5.5 bar absolute. LOX refrigerant from an external source at a purity of about 99.8% $O_2$ is injected into the main heat exchanger E1 at a flow rate of about 50 $Nm^3/h$ (0.8 $Nm^3/s$) where it is vaporized and warmed to ambient temperature. LOX product at about 95% $O_2$ purity and at a contained $O_2$ flow of 2090 $Nm^3/h$ (35 $Nm^3/s$) leaves the low pressure column C2 at about 1.4 bar absolute. The pressure of the LOX product stream is increased by about 0.8 bar absolute due to static head and after vaporization and warming leaves the main heat exchanger at about 2.0 bar absolute. The two warmed GOX streams are combined giving a contained $O_2$ flow of 2140 $Nm^3/h$ (36 $Nm^3/s$) of GOX.

The economics of the present invention compare favourably with those of $O_2$ VSA plants at product flows above 870 $Nm^3/h$ (15 $Nm^3/s$). The present invention has the same or lower gas cost without the much higher capital cost or reliability issues of the $O_2$ VSA plants. In addition, the economics of the present invention also compare favourably with those of a cryogenic plant with an expander at a capacity of about 3480 $Nm^3/h$ (58 $Nm^3/s$). Again, the present invention is economic having the same gas cost and lower capital cost.

It is not obvious to introduce the LOX refrigerant into the heat exchanger at an intermediate point between the warm and cold ends to provide refrigeration for several reasons. First, it is less efficient thermodynamically to provide refrigeration by indirect heat exchange using a stream of LOX refrigerant injected into a heat exchanger separately from the LOX product rather then to provide equivalent refrigeration by injection of the LOX refrigerant directly into the LOX product stream before vaporization in the heat exchanger. In addition, the design of a heat exchanger that is suitable for carrying out the invention is more complicated and therefore more expensive than a conventional heat exchanger. Further, it is simply inefficient thermodynamically to inject a LOX refrigerant stream into a warm part of a heat exchanger. One reason for injecting the LOX refrigerant in this way is to reduce the likelihood of an explosive energy release following the build up of hydrocarbons as a result of the deposition of dissolved impurities in the LOX.

Some of the advantages of the exemplified embodiment of the present invention are as follows:

the distillation column system is not back-pressurized and hence the air pressure is minimized;

GOX is produced with minimal air flow as substantially all of the $O_2$ in the feed air and all of the LOX refrigerant becomes GOX product;

as a result of the lack of back-pressurization and minimal air flow, the air compressor power is minimized;

GOX is produced at about 2.0 bar absolute directly from the cryogenic section; and as a result of using vacuum insulation and a main heat exchanger with at least about 55 NTU, the amount of LOX refrigerant is minimized.

It will be appreciated that the invention is not restricted to the details described above with reference to the preferred embodiments but that numerous modifications and variations can be made without departing from the spirit and scope of the invention as defined in the following claims.

What is claimed is:

1. In a process for the production of gaseous oxygen ("GOX"), said process comprising:

cooling and at least partially condensing feed air (1) by heat exchange using heat exchange means (E1) having a warm end and a cold end to produce cooled and at least partially condensed feed air (2);

distilling said cooled and at least partially condensed feed air (2) in a distillation column system (C1, C2) to produce liquid oxygen ("LOX") product;

removing a stream (8) of said LOX product from the distillation column system (C1, C2) and vaporizing said LOX product stream (8) by heat exchange (E1) against the feed air (1) to produce GOX; and separately from the LOX product, vaporizing LOX refrigerant (10) from an external source by heat exchange (E1) against the feed air (1) to produce vaporized refrigerant (11) thereby providing a portion of the refrigeration duty required to cool and at least partially condense the feed air;

the improvement consisting of injecting the LOX refrigerant into the heat exchange means (E1) at a pressure greater than that of the LOX product entering the heat exchange means.

2. The process according to claim 1 further comprising combining the vaporized LOX refrigerant (10) with the GOX (9) produced by the vaporization of the LOX product to produce GOX product (12).

3. The process according to claim 1, wherein the LOX refrigerant (10) provides all of the external refrigeration duty required to keep the process in energy balance.

4. The process according to claim 1, wherein the pressure of the LOX refrigerant (10) is from about 4 bar absolute to about 10 bar absolute.

5. The process according to claim 1 further comprising pressurizing the LOX product stream (8) before vaporizing said stream by heat exchange (E1) to provide GOX (9).

6. The process according to claim 5, wherein the LOX product stream is pressurized hydrostatically.

7. The process according to claim 5 wherein the LOX product stream is pressurized by pumping the stream.

8. The process according to claim 1, wherein the pressure of the GOX product is from about 1.5 bar absolute to about 3.0 bar absolute.

9. Apparatus for carrying out the process of claim 1 to produce gaseous oxygen, said apparatus comprising:

heat exchange means (E1) for cooling and at least partially condensing feed air (1) to produce cooled and at least partially condensed feed air (2), said heat exchange means (E1) having a warm end and a cold end;

a distillation column system (C1, C2) for distilling cooled and at least partially condensed feed air (2) to produce LOX product (8);

conduit means to carry the cooled and at least partially condensed feed air (2) from the heat exchange means (E1) to the distillation column system (C1, C2); and conduit means to carry LOX product (8) from the distillation column system (C1, C2) to the heat exchange means (E1);

wherein the apparatus further comprises conduit means to carry LOX refrigerant (10) at a higher pressure than the pressure of the LOX product entering the heat exchange means from an external supply to the heat exchange means (E1).

10. The apparatus according to claim 9, wherein the heat exchange means (E1) has from about 70 to about 90 NTU.

11. In a process for the production of GOX, said process comprising:

cooling and at least partially condensing feed air (1) by heat exchange using heat exchange means (E1) having a warm end and a cold end to produce cooled and at least partially condensed feed air (2);

distilling said cooled and at least partially condensed feed air (2) in a distillation column system (C1, C2) to produce liquid oxygen ("LOX") product;

removing a stream (8) of said LOX product from the distillation column system (C1, C2) and vaporizing said LOX product stream (8) by heat exchange (E1) against the feed air (1) to produce GOX; and separately from the LOX product, vaporizing LOX refrigerant (10) from an external source by heat exchange (E1) against the feed air (1) to produce vaporized refrigerant (11) thereby providing a portion of the refrigeration duty required to cool and at least partially condense the feed air;

the improvement consisting of injecting the LOX refrigerant into the heat exchange means (E1) at a pressure substantially equal to that of the LOX product entering the heat exchange means and at an intermediate point between the warm and cold ends where the temperature of the heat exchange means (E1) is above the boiling temperature of the LOX refrigerant.

12. The process according to claim 11, wherein the temperature of the heat exchange means (E1) at the point at which the LOX refrigerant is injected is from about −165° C. to about −80° C.

13. The process according to claim 11 further comprising combining the vaporized LOX refrigerant (10) with the GOX (9) produced by the vaporization of the LOX product to produce GOX product (12).

14. The process according to claim 11, wherein the LOX refrigerant (10) provides all of the external refrigeration duty required to keep the process in energy balance.

15. The process according to claim 11, wherein the pressure of the LOX refrigerant (10) is from about 4 bar absolute to about 10 bar absolute.

16. The process according to claim 11 further comprising pressurizing the LOX product stream (8) before vaporizing said stream by heat exchange (E1) to provide GOX (9).

17. The process according to claim 16, wherein the LOX product stream is pressurized hydrostatically.

18. The process according to claim 16 wherein the LOX product stream is pressurized by pumping the stream.

19. The process according to claim 11, wherein the pressure of the GOX product is from about 1.5 bar absolute to about 3.0 bar absolute.

20. Apparatus for carrying out the process of claim 11 to produce gaseous oxygen, said apparatus comprising:

heat exchange means (E1) for cooling and at least partially condensing feed air (1) to produce cooled and at least partially condensed feed air (2), said heat exchange means (E1) having a warm end and a cold end;

a distillation column system (C1, C2) for distilling cooled and at least partially condensed feed air (2) to produce LOX product (8);

conduit means to carry the cooled and at least partially condensed feed air (2) from the heat exchange means (E1) to the distillation column system (C1, C2); and conduit means to carry LOX product (8) from the distillation column system (C1, C2) to the heat exchange means (E1);

wherein the apparatus further comprises conduit means to carry LOX refrigerant (10) at a pressure that is substantially equal to the pressure of the LOX product entering the heat exchange means from an external supply to an intermediate point between the warm and cold ends of the heat exchange means where the temperature of the heat exchange means is above the boiling temperature of the LOX refrigerant.

21. The apparatus according to claim 20, wherein the heat exchange means (E1) has from about 70 to about 90 NTU.

* * * * *